United States Patent
Chang et al.

(10) Patent No.: US 6,553,427 B1
(45) Date of Patent: Apr. 22, 2003

(54) OBJECT-ORIENTED ENCAPSULATION OF A TELECOMMUNICATIONS SERVICE PROTOCOL INTERFACE

(75) Inventors: Chen-Huei Chang, Colorado Springs, CO (US); James Edward Patterson, Colorado Springs, CO (US); Paul Thomas Schultz, Woodland Park, CO (US); Richard Charles Stilborn, Colorado Springs, CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/122,130

(22) Filed: Jul. 24, 1998

(51) Int. Cl.[7] .............................................. G06F 9/44
(52) U.S. Cl. ..................................... 709/314; 709/315
(58) Field of Search ................................. 709/314, 315

(56) References Cited

U.S. PATENT DOCUMENTS 5,764,915 A * 6/1998 Heimsoth et al.
5,862,325 A * 1/1999 Reed et al.
H1921 H * 11/2000 Fletcher et al.

OTHER PUBLICATIONS

Evans et al., "Using Java Applets and Corba for Multi–User Distributed Applications" IEEE, pp. 43–55, 1997.*

* cited by examiner

*Primary Examiner*—Emanuel Todd Voeltz

(57) ABSTRACT

The present invention provides an abstract, object-oriented encapsulation of the communications interface between intermediary, lower-level protocol handlers, such as TCAP server programs, and service providers, such as service application programs, that run on transaction server computers within an enhanced services platform, such as a network intelligent platform of a telecommunications carrier. The TCAP server programs exchange INAP messages with network switches through the SS7 protocol interface, forwarding the INAP messages received from network switches to service application programs, and receiving response messages from service application programs to be sent back to the network switches. The specialized INAP protocol handling software previously developed specifically for each different service application program is abstracted by the object-oriented communications interface into a set of library routines that can be shared in common by all service application programs and TCAP servers. These library routines handle routing of INAP messages to service application programs and TCAP server programs, assigning INAP messages to the context of a dialogue between a service application program and a network switch, formatting INAP messages, encoding and decoding the data contained in the INAP messages, and maintaining configuration information about the network intelligent platform.

35 Claims, 9 Drawing Sheets

OBJECT-ORIENTED ENCAPSULATION OF A TELECOMMUNICATIONS SERVICE PROTOCOL INTERFACE

TECHNICAL FIELD

The present invention relates to client server communications interfaces and, in particular, to a communications interface between servers and service application programs running on a transaction server computer.

BACKGROUND OF THE INVENTION

Telecommunications networks use computer platforms, called network intelligent platforms ("NIP"), to provide enhanced telephone services such as toll-free 800 call routing and virtual private network call routing. A telephone call originates in a local exchange carrier ("LEC") network and propagates from the LEC network to a switch, such as an originating switch or a terminating switch. For example, the originating switch processes the telephone call and routes the call to its destination. The destination may be in a different LEC or in a different type of telecommunications network, including a public switch telephone network ("PSTN"). The originating switch determines when processing for enhanced services is required for a telephone call. When processing for enhanced services is required, the originating switch opens a dialogue with a NIP, exchanging with the NIP higher-level protocol messages embedded within lower-level SS7 protocol messages. Signaling System No. 7 ("SS7"), is a well known dialogue-based communications protocol that may be used for communications with computing platforms such as the NIP. The data exchanged using the SS7 protocol interface between an originating switch and a NIP is commonly formatted into intelligent network application protocol ("INAP") messages. At the end of the exchange of INAP messages that comprises a dialogue between an originating switch and a NIP, the NIP directs the originating switch to connect the telephone call to a final destination. In the event of an error, the originating switch will be directed to terminate the call. The exchange of INAP messages between originating switches and NIPs constitutes a telecommunications service protocol interface, the INAP protocol interface, implemented on top of the lower-level SS7 protocol interface.

A NIP contains several computers known as transaction servers. Transaction servers simultaneously execute two types of software programs. The first type of program is a Transactions Capability Application Part ("TCAP") server that receives messages from originating switches and that sends response messages back to the originating switches. A TCAP server extracts INAP messages from the SS7 protocol messages that the TCAP server receives from originating switches and forwards the INAP messages to service application programs, the second type of software program that runs on transaction servers. Service application programs process enhanced service requests from originating switches and communicate with the originating switch by exchanging INAP messages. Service application programs send response INAP messages back to TCAP servers which, in turn, direct the response messages back to the originating switches.

Service application programs must include specialized communications software for handling the exchange of INAP messages through the INAP protocol interface. In particular, this specialized communications software must keep track of the originating switch that sent an incoming message as well as the TCAP server through which the incoming message passed so that responses to the incoming message can be returned to the same originating switch that sent the incoming message through the same TCAP server through which the incoming message passed. The specialized communications software must also maintain state information about each separate dialogue that is conducted between an originating switch and a service application. A dialogue can extend over the exchange of many different INAP messages. In addition to the INAP messages, Integrated Services Digital Network ("ISDN") user part ("ISUP") messages may also be embedded within SS7 protocol messages. The specialized communications software included in service applications must therefore detect ISUP messages and handle them as well. The specialized communications software must handle the different encoding and decoding schemes used for the data included in INAP messages and must process many separate fields within the INAP message header contained in a typical INAP message. The specialized communications software must also maintain detailed configuration information about the particular transaction server on which the service application is running.

When a new service application program is developed, the specialized communication software is generally written specifically for the new service application program. When the configuration of the transaction server is changed or modified, the specialized communications software of each service application program that runs on that transaction server must correspondingly be modified to include updated configuration information that the specialized communications software uses to route messages to and from NIP. As a result, the maintenance of existing service applications and the creation of new service applications are often costly and complicated tasks. A need has therefore been recognized for abstracting the communications interface between TCAP servers and service applications so that the service applications need not themselves include specialized communications software.

SUMMARY OF THE INVENTION

The present invention provides an abstract, object-oriented encapsulation of the communications interface between intermediary, lower-level protocol handlers, such as TCAP servers, and higher-level telecommunications service providers, such as the service application programs that run on transaction server computers within an enhanced services platform, such as a NIP. A TCAP server receives a TCAP message that includes a request INAP message from a telephone network switch seeking an enhanced service provided by the NIP. The request INAP message includes a request type and request data. The TCAP server extracts the request INAP message from the TCAP message and encapsulates the request INAP message in a message encapsulation interface object. The TCAP server then passes the message encapsulation interface object to a service application program by calling a transfer method of an object transfer interface object within the TCAP server. The service application program receives the message encapsulation interface object by calling a transfer method of an object transfer interface object within the service application program. The service application program then obtains the type and request data from the message encapsulation interface object by calling methods of the message encapsulation interface object.

The abstract, object-oriented communications interface of the present invention greatly simplifies the development and maintenance of service application programs. The specialized INAP communications handlers that were formerly developed for each different service application program can now be replaced by including in each service application program the library routines of the abstract, object-oriented communications interface of the present invention.

DETAILED DESCRIPTION OF THE INVENTION

The present invention provides an abstract, object-oriented encapsulation of the communications interface between intermediary, lower-level protocol handlers, such as TCAP servers and higher-level telecommunication service providers, such as service application programs running on transaction server computers within an enhanced services platform, such as a NIP. The abstract interface of the present invention is implemented as a set of software library routines that are called by TCAP servers and service application programs. The library routines of the abstract interface provide a few simple object-oriented methods to TCAP servers and service application programs that enable them to exchange information contained in underlying INAP messages. The library routines of the abstract interface handle the complex INAP protocol management functions that were previously implemented as specialized communications software within TCAP servers and service applications. The abstract interface of the present invention greatly simplifies the development of new service applications and the maintenance of existing service applications by centralizing INAP protocol management into a set of library routines commonly shared by TCAP servers and service application programs.

The abstract interface of the present invention is preferably implemented as a set of C++ interface objects. These interface objects encapsulate INAP messages and generally include all additional information needed to direct the FNAP messages to their destinations within the context of a dialogue between an originating switch and a service application program. These interface objects present a very simple set of C++ methods that can be called by TCAP servers and service application programs to receive encapsulated INAP messages from message queues associated with the TCAP servers and service application programs and to direct encapsulated INAP messages to the message queues associated with destination processes. Thus, rather than explicitly handling the INAP protocol interface, TCAP servers and service application programs instead pass C++ interface objects back and forth through an abstract interface. The abstract interface represents a new, higher-lever, simplified communications protocol.

Figure 1:
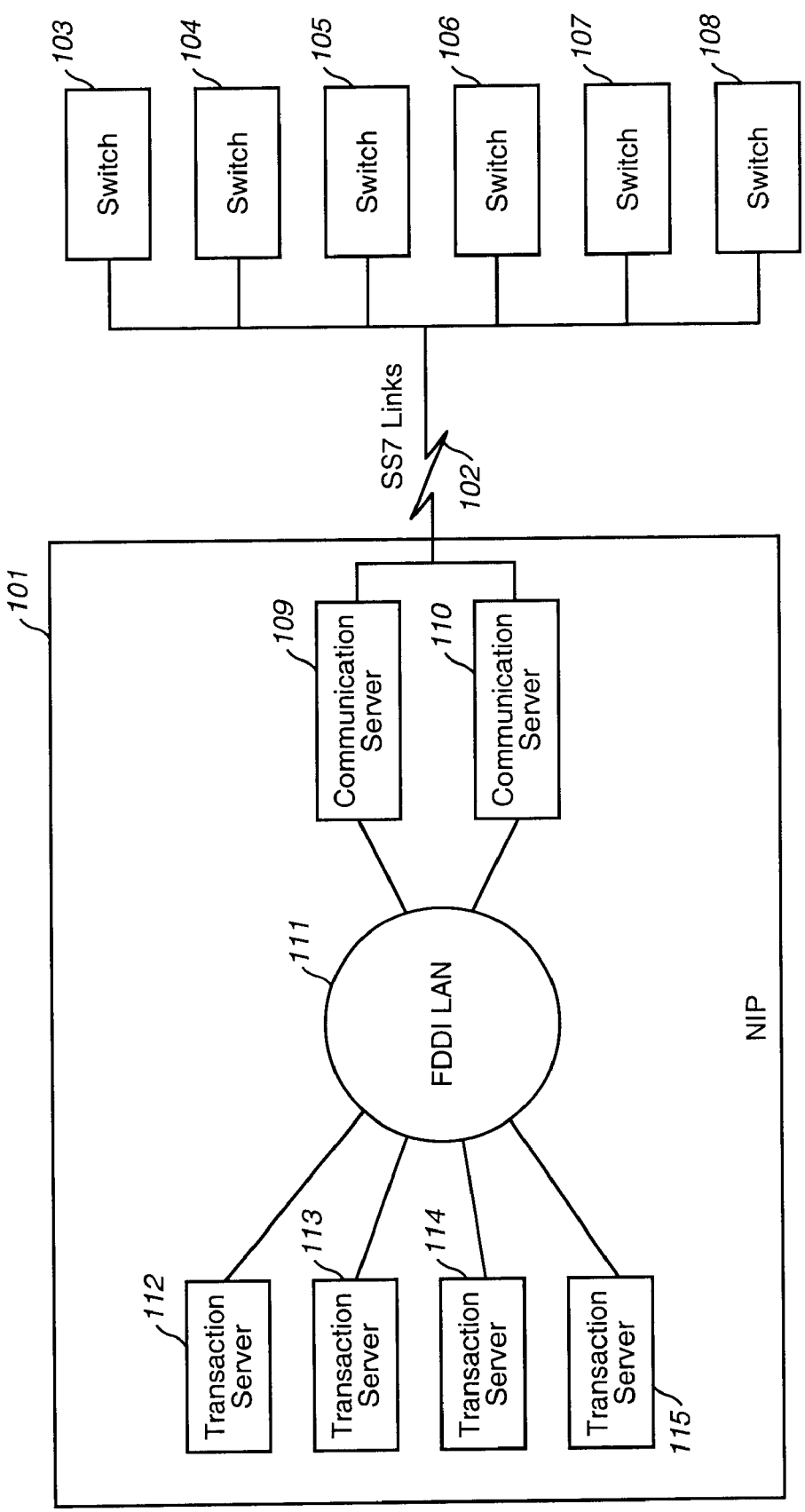
FIG. 1 displays the network architecture of a NIP.

FIG. 1 displays the network architecture of a NIP, the framework on which the present invention is implemented. The NIP 101 is connected through SS7 communications links 102 to a number of originating switches 103–108 that receive incoming telephone calls from LEC networks. The topology of the network connections between the originating switches and the NIP can be quite complex, involving many intermediate level signal transfer points not shown in FIG. 1. The NIP includes one or more communications servers 109–110 that perform protocol and message format translations on incoming SS7 messages, when necessary, and direct the incoming messages through a FDDI local area network ("LAN") 111 to a number of transaction server computers 112–115. A Fiber Distributed Data Interface or FDDI, is a transmission protocol developed for fiber-optic LANs. The transaction server computers 112–115 process requests for enhanced services embodied in the messages passed to them by the communications servers 109–110 and respond to those messages by sending responses back through the FDDI LAN 111 to the communications server computers. The communications server computers then transmit the responses embedded in SS7 protocol messages back to the originating switches.

Figure 2:
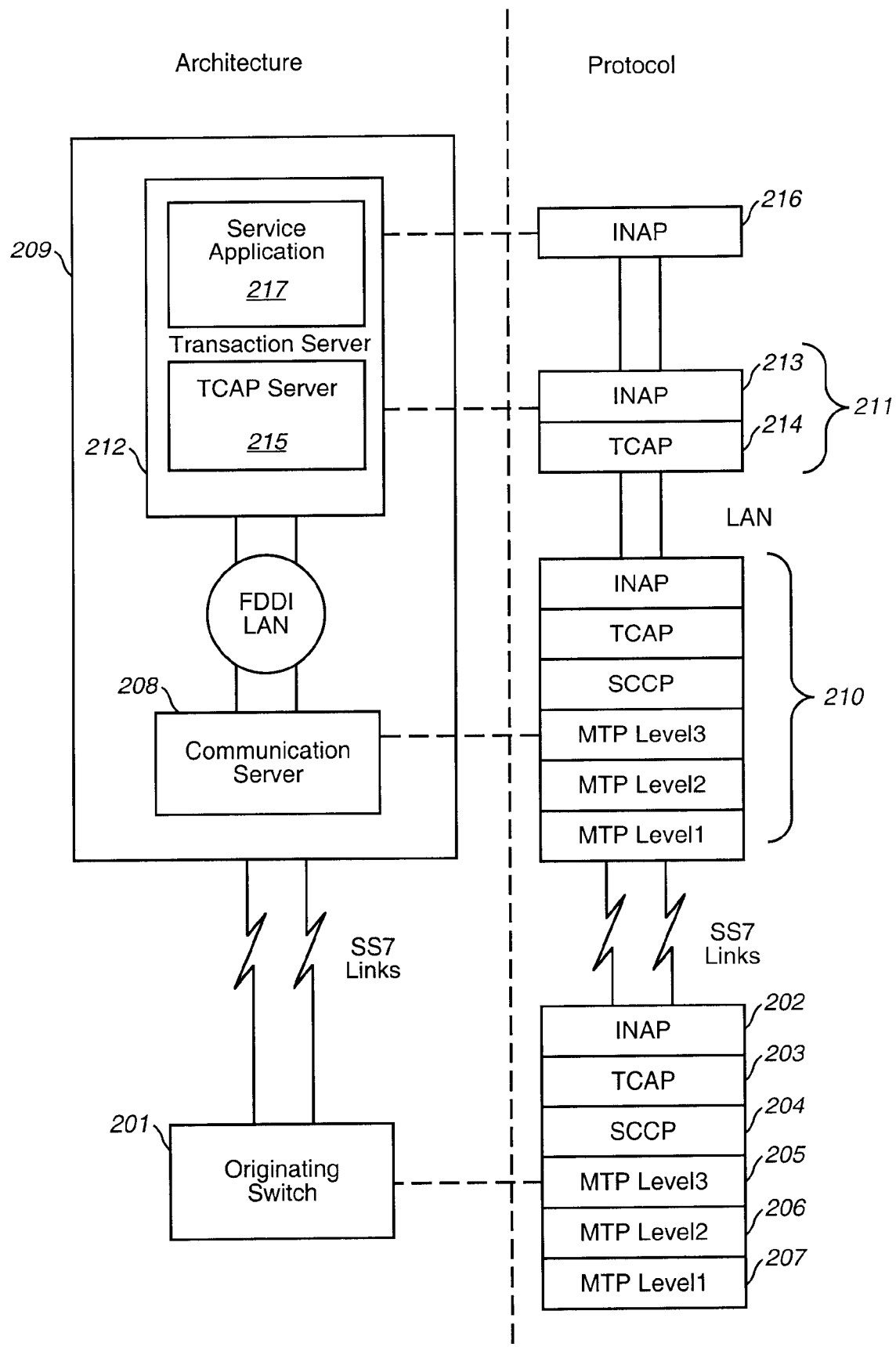
FIG. 2 displays the NIP network architecture in parallel with the nested communications protocols that are received and transmitted by each component of the NIP.

FIG. 2 displays the NIP network architecture in parallel with an indication of the nested communications protocols that are received and transmitted by each component of the NIP. The originating switch 201 packages a request for enhanced services into an INAP message 202. The originating switch packages the INAP message within a TCAP message 203 which is, in turn, embedded within messages of a number of additional protocol levels 204–207. Each protocol level requires a separate message header to be appended to the message of the next lowest protocol layer. The entire nested collection of protocol layer headers and the request data constitutes a single SS7 protocol message.

The originating switch transmits a request for enhanced services within the SS7 protocol message to a communications server computer 208 within NIP 209. The communications server computer processes the received SS7 protocol message 210 and extracts from it a TCAP message 211 which it transmits to the transaction server computer 212. Note that the TCAP message 211 has only two protocol layers, the underlying INAP protocol layer 213 and the enclosing TCAP protocol layer 214. The TCAP server 215 running on the transaction server receives the TCAP message, extracts the INAP message 216 from the TCAP message and forwards the INAP message to a service application program 217.

One way to consider the communications interfaces displayed in FIG. 2 is that an originating switch communicates with a specific service application program using the INAP protocol interface. The remaining protocol layers of a SS7 message are used to direct an INAP message through the various communications interfaces intervening between the originating switch and the service application program.

Figure 3:
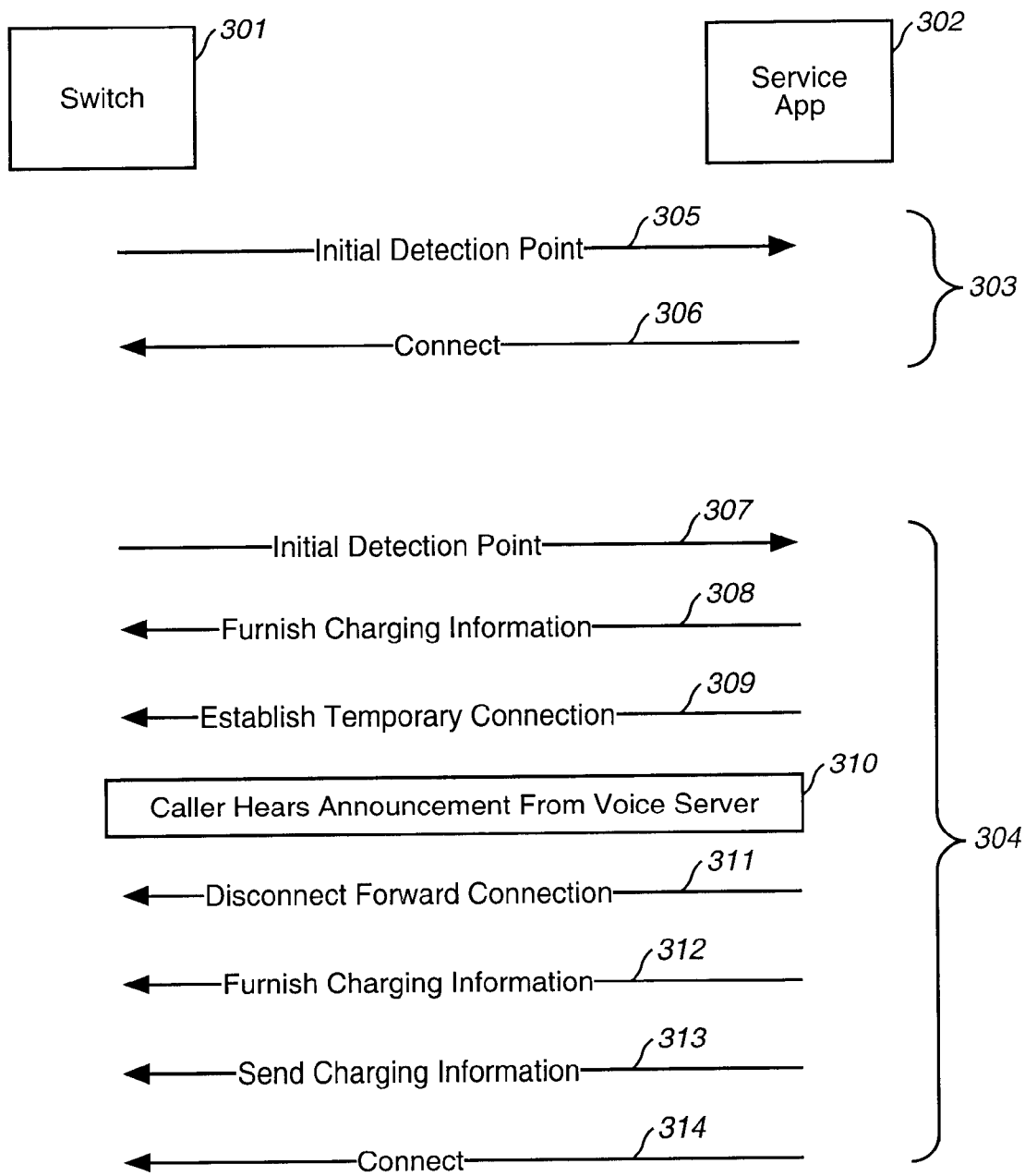
FIG. 3 displays several example INAP message dialogues between an originating switch and a service application program.

FIG. 3 displays example dialogues between an originating switch and a service application program. The originating switch 301, in handling an incoming telephone call, determines that it must seek enhanced services provided by service application program 302 running on a NIP. Two simple unrelated dialogues 303 and 304 are shown in FIG. 3.

The first dialogue 303 represents a request by the switch to translate a destination 800 number into a physical routing address. The originating switch initiates the dialogue by sending an initial detection point ("IDP") message to the service application program 305. This IDP message represents a single INAP operation. The message includes the 800 number to be translated and an indication of the specific translation service that the originating switch is requesting. The service application program receives the request, looks up the 800 number in a database to find a physical routing address that corresponds to the 800 number, formats the physical routing address into an INAP response message, and sends the response message 306 back to the originating switch. In this case, the response message is an INAP Connect message that includes the physical routing address to which the switch should connect the incoming call. The INAP Connect message thus terminates the dialogue between the originating switch and the service application program.

The next dialogue 304 displayed in FIG. 3 is somewhat more complicated. This dialogue represents a request by the originating switch to route a telephone call to a voice server that plays an announcement to the caller and then, following completion of the announcement, to route the telephone call to a final destination. Again, the originating switch initiates the dialogue with an IDP message 307. The IDP message represents an INAP operation that requests routing of the telephone call to a voice server. The service application first replies with a FurnishCharginglnformation message 308 that directs the originating switch to add billing information included in the FurnishCharginglnformation message to a tabulation of the total charges for the telephone call maintained by the originating switch. The service application then sends to the originating switch an EstablishTemporary-Connection message 309 which directs the originating switch to route the telephone call temporarily to a specific voice server. The voice server then plays a recorded announcement 310. When the announcement is finished, the service application program directs the originating switch to disconnect the telephone call from the voice server by sending to the originating switch a DisconnectForwardConnection message 311. Then the service application program sends to the originating switch a FurnishChargingInforna-tion message 312 that causes the originating switch to further increment the tabulation of charges for the telephone call. The service application program then sends a Send-ChargingInformation message 313 to the originating switch. This SendChargingInformation message directs the originating switch to complete its tabulation of the charges for the call and send the tabulation to a downstream processing system. Finally, the service application program sends a Connect message 314 which directs the originating switch to connect the telephone call to a final physical routing address. The Connect message ends the dialogue between the originating switch and the service application program.

It should be noted that the INAP messages exchanged between an originating switch and a service application program during a dialogue do not necessarily fall into a strict request/response sequence. As shown in the second dialogue 304 of FIG. 3, the service application program may send several discrete INAP messages back to the originating switch without an intervening response from the originating switch. Much of the complexity of the specialized communications software that is included in service application programs arises from the complexity and variety of dialogues that may occur between an originating switch and the service application program. State information is saved by the specialized communications software for each concurrent dialogue being conducted by the service application program with all connected originating switches. Many different discrete pieces of information must be stored and maintained over the course of the dialogue by the service application program. Finally, the specialized communications software must keep track of routing information for each dialogue to ensure that individual FNAP messages are directed to the appropriate originating switch.

Figure 4:
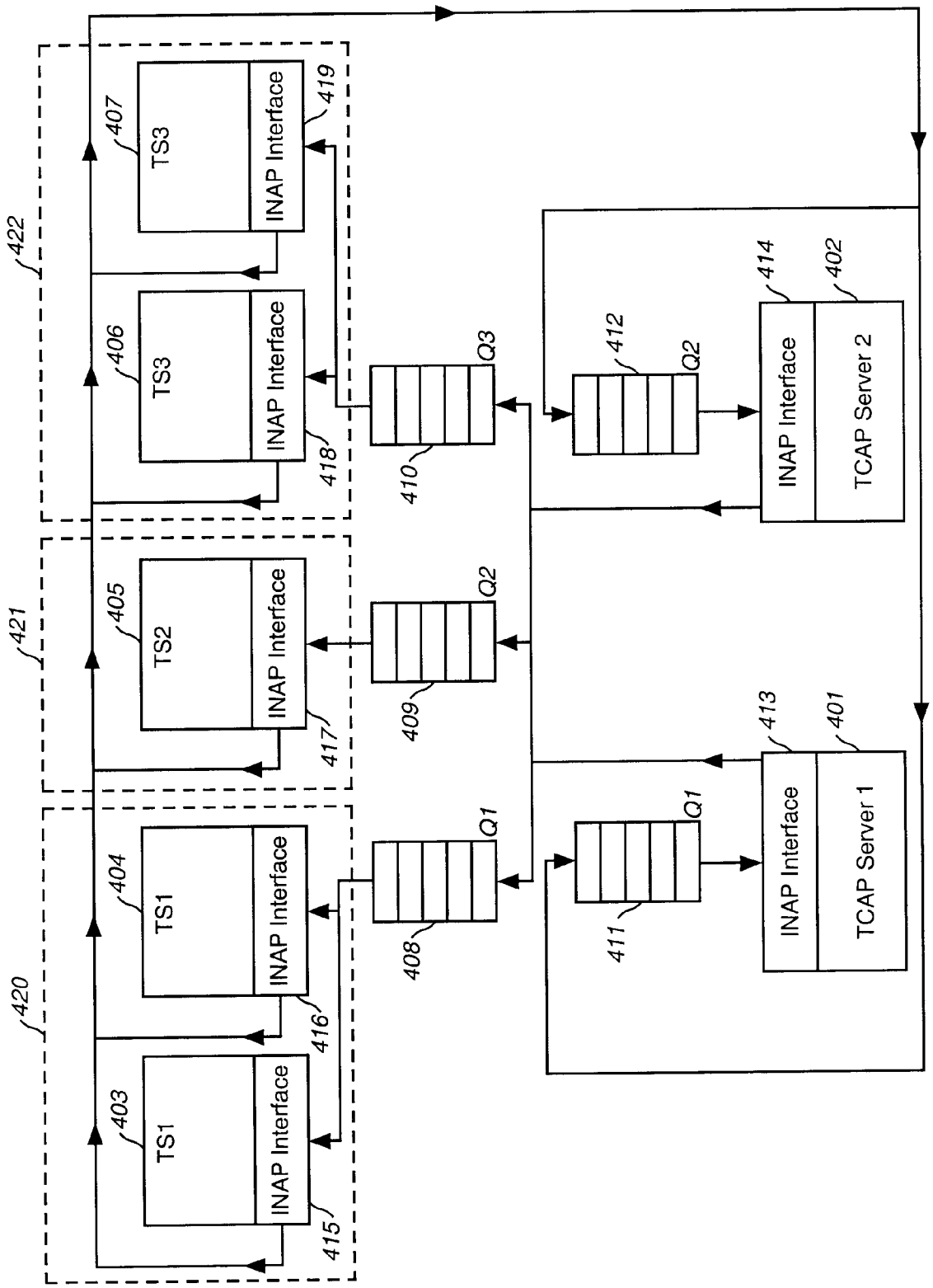
FIG. 4 displays the internal message transfer architecture of a transaction server.

FIG. 4 displays the internal messaging architecture of a NIP transaction server. The transaction server is generally a midrange computer that runs one or more TCAP server processes 401–402 and a number of instances of service application programs 403–407. For a given service application program, the transaction server may instantiate one or more separate running processes. In the example shown in FIG. 4, for example, service application program instances 403 and 404 correspond to service application program 420, service application program instance 405 corresponds to service application program 421, and service application program instances 406 and 407 correspond to service application program 422. There is a single message queue 408–410 associated with each service application program. Message queue 408 is associated with the service application program 420, message queue 409 is associated with service application program 421, and message queue 410 is associated with service application program 422. There is a single message queue 411–412 associated with each TCAP server process.

The abstract, object-oriented communications interface of the present invention, referred to below as the INAP interface, is a set of library routines that are shared by both TCAP server processes and by instances of service application programs. Accordingly, in FIG. 4, an INAP interface component 415–419 is included in each instance of the service application program and an INAP interface component 415–419 is included in each TCAP server process. A TCAP server sends a high-level interface object to an instance of a target service application program by calling INAP interface routines that direct the interface object to the appropriate message queue associated with the target service application program. Thus, TCAP server 401 may send an interface object through INAP interface 413 to message queue 408. The target service application program instance can then acquire the interface object by calling INAP interface routines to remove the interface object from message queue 408. In similar fashion, a service application program instance can send a reply interface object back to a TCAP server by calling INAP interface functions to place the interface object into the appropriate message queue associated with that TCAP server.

Embedded in each interface object exchanged through the abstract communications interface of the present invention is a standard INAP message along with additional information required by the abstract communications interface to keep track of the message within the context of an ongoing dialogue between an originating switch and a service application program and routing information that allows subroutines of the INAP interface to direct the message to a message queue of a service application program or a TCAP server. Class definitions 1–7 below display simple C++ class definitions of seven interface objects, including the INAP_Context object, the INAP_Operation object, the INAP_InterfaceData object, the Network_ContextID object, the Service_ContextID object, the INAP_Interface object, and the CommsChannel object. In this application, indented text of a different font corresponds to pseudocode or exemplary code.

Class Definition 1

```
1   class INAP_Context
2   {
3       private:
4           int INAP_Id;
5           int reuseCount;
6           int tCAP_ServerId:
7   }
```

The INAP_Context object includes information used by the INAP interface to direct INAP operation objects that include TNAP messages to the appropriate TCAP server or service application program. This information includes an identifier for the TCAP server.

Class Definition 2

```
1   class INAP_Operation
2   {
3       public:
4
5           union inap_ops
6           {
7               struct CS1initialDP                     CS1initialDP;
8               struct CS1connect                       CS1connect;
9               struct CS1releaseCall                   CS1releaseCall;
10              struct CS1requestReportBCSMEvent        CS1requestReportBCSMEvent;
11              struct CS1eventReportBCSM               CS1eventReportBCSM;
12              struct CS1sendChargingInformation       CS1sendChargingInformation;
13              struct CS1furnishChargingInformation
14                                                      CS1furnishChargingInformation;
15              struct INAPcontrol                      INAPcontrol;
16          };
17
18          enum OperationType
19          {
20              CS1INITIALDP        = 1,
21              CS1CONNECT          = 3,
22              CS1RELEASECALL      = 4,
23              CS1RRBCSM           = 5,
24              CS1ERBCSM           = 6,
25              CS1CONTINUE         = 12,
26              CS1SCINFO           = 18,
27              CS1FCINFO           = 19,
28              INAPCONTROL         = 20,
29              Num_Op_Types
30          };
31
32          INAP_Operation( INAP_InterfaceData& inData );
33          INAP_Operation();
34          virtual ~INAP_Operation();
35
36          virtual void clean();
37
38          void setOperationType( const enum OperationType inOperationtype );
39          void setOperationData( const union inap_ops* const inOp );
40          void setNetwork_ContextID( const contextID_t const iNAP_Id,
41                                     const enum INAP_Interface::ServerID
                                                                  serverId,
42                                     const int              inReference,
43                                     const pid_t            myPid,
44                                     const unsigned long    reuseCount );
45          void setNetwork_ContextID(  const Network_ContextID* const networkId
                                     );
46          void setService_ContextID( const Service_ContextID* const inServiceId
                                     );
47          void*               getOperation() const;
48          int                 getSize() const;
49          enum OperationType  getOperationType() const;
50          union inap_ops*     getOperationData();
51          Network_ContextID*  getNetwork_ContextID() const;
52          Service_ContextID*  getService_ContextID() const;
```

-continued

Class Definition 2

```
53
54      protected:
55
56          INAP_InterfaceData& data;
57      }
```

The INAP_Operation object includes data that provides a reference to an INAP_InterfaceData instance. A clean( ) function serves as a virtual function for initializing all types of INAP Operation data. A setOperationType( ) function sets the INAP Operation type. A setOperationData( ) function initializes the INAP Operation data. A setNetwork_ContextID( ) function provides methods for setting the Network_Context in the INAP_InterfaceData. A getOperation( ) function provides a method for retrieving the INAP_InterfaceData instance. A getSize( ) function provides methods for retrieving INAP Operation data size. A getOperationType( ) function provides methods for retrieving the INAP Operation type. A getOperationData( ) function provides methods for retrieving the INAP Operation. A getNetwork_ContextID( ) function provides methods for retrieving the Network ContextID. A getService_ContextID( ) function provides methods for retrieving the Service ContextID.

Class Definition 3

```
1   class INAP_InterfaceData
2   {
3       public:
4           INAP_InterfaceData();
5           INAP_InterfaceData(   const int                    inOpType,
6                                 const unsigned char          inReference,
7                                 const union inap-ops*        inOp,
8                                 const contextID_t            iNAP_Id,
9                                 const pid_t                  myPid );
10          ~INAP_InterfaceData();
11
12          int getSize();
13          int getMaxSize();
14
15      private:
16          enum { MAX_DATA_BUFFERS = 10000 };
17
18          static INAP_InterfaceData* freeList;
19          static int numDataBuffers;
20
21          Network_ContextID    networkId;
22          Service_ContextID    serviceId;
23          int                  operationType;
24          union inap_ops       operation;
25
26          void*    operator new ( size_t size );
27          void     operator delete ( void* block );
28
29          void clean();
30  }
```

Within the INAP_InterfaceData object, freeList provides network re-usable memory for a new INAP Operation. NumDataBuffers provides the number of previously allocated memory for INAP Operations. NetworkId provides a pointer to the call context in the TCAP Server. ServiceId provides a pointer to the call context in the service application program. OperationType provides the INAP Operation type, and operation provides the INAP Operation.

In the INAP_InterfaceData object, the getSize( ) function provides methods for retrieving the message size of INAP Operation class object. The getMaxSize( ) function provides methods for retrieving the maximum size of an INAP Operation object. The new( ) function is an operator overload function that re-uses the memory allocated earlier from another INAP Operation. The deletes function is an operator overload function that puts the pointer to the memory of an INAP Operation to the free list for re-use.

Class Definition 4

```
1   class Network_ContextID
2   {
3       public:
4           Network_ContextID();
5           Network_ContextID(   const enum INAP_Interface::ServerID   inServerId,
6                                const contextID_t                     inINAP_Id,
7                                const int                             inReference,
8                                const pid_t                           inTCS_Pid,
9                                const unsigned long                   inReuseCount );
10          ~Network_ContextID()    {};
11
12          setReference ( const int inReference );
13          setINAP_Id ( const contextID_t inINAP_Id );
14          setServerID ( const enum INAP_Interface::ServerID inServerID );
15          setTCS_Pid ( const pid_t inTCS_Pid );
16          setReuseCount ( const unsigned long inReuseCount );
17
18          int                         getReference () const;
19          contextID_t                 getINAP_Id() const;
20          enum INAP_Interface::ServerID getServerId() const;
21          pid_t                       getTCS_Pid() const;
22          unsigned long getReuseCount() const;
23
24      private:
25
26          enum INAP_Interface::ServerID serverId;
27          int                         reference;
28          contextID_t                 iNAP_Id;
29          pid_t                       tcsPid;
30          unsigned long               reuseCount;
31
32  }
```

In the Network_ContextID object, serverId provides an identification for the TCAP Server that passes the INAP operations of a call between the originating switch and the service application. Reference provides a TCAP message correlation id of a call context. The iNAP_Id provides a pointer to the call context in the TCAP Server. The tcsPid provides the TCAP Server process ID. Combining reuseCount and tcsPid ensures that the INAP Operation received from the service application belongs to the call context in memory.

In the Network_ContextID object, the setReference( ) function provides methods for setting reference data. The setINAP_Id( ) function provides methods for setting iNAP_Id data. The setServerId( ) function provides methods for setting the serverId data. The setTCS_Pid( ) function provides methods for setting the tcsPid data. The setReuseCount( ) function provides methods for setting reuseCount data. The getReference( ) function provides methods for getting reference data. The getINAP_Id( ) function provides methods for retrieving iNAP_Id data. The getServerId( ) function provides methods for getting serverId data. The getTCS_Pid( ) function provides methods for retrieving tcsPid data. The getReuseCount( ) function provides methods for retrieving reuseCount data.

| Class Definition 5 |
| --- |

```
1   class Service_ContextID
2   {
3       public
4           Service_ContextID();
5           Service_ContextID( unsigned char inServerId,
6                              unsigned int inIndex,
7                              bool isValid = true );
8           Service_ContextID( const Service_ContextID& rhs );
9           ~Service_ContextID();
10          setServerId ( const unsigned char inServerId );
11          unsigned char getServerID() const;
12
13          void setCallContextIndex ( unsigned int inCallContextIndex );
14          unsigned int getCallContextIndex() const;
15          void setValid( bool isValid );
16          bool isValid() const;
17
18      private:
19
20          unsigned char serverId;
21          unsigned int p_CallContextIndex;
22          bool p_valid;
23
24  };
```

In the Service_ContextlD object, the serverId provides the service plication program server ID. The p_CallContextIndex provides a pointer to the service application program context. The p_valid provides a flag that indicates if the context will still be valid.

In the Service_ContextID object, the setServerId( ) function provides methods for setting the server ID. The getServerId( ) function provides methods for retrieving the server ID. The setCallContextIndex( ) function provides methods for ting the value of p_CallContextIndex. The getCallContextIndex( ) function provides methods for retrieving the value of p_CallContextIndex. The setValid( ) function provides methods for setting the value of p_valid. The is valid( ) function returns a value of true when the value of p_valid is "true."

| Class Definitions 6 |
| --- |

```
1   class INAP_Interface
2   {
3       public:
4
5           enum AttachMode
6           {
7               SHARED      = 1,
8               EXCLUSIVE   = 2
9           };
10
11          enum ServerID
12          {
13              INVALID_SERVER_ID                       = 0,
14              CALL_PROCESSING                         = 1,
15              TCAP_SERVER_LOWER_BOUND = 2,
16              TCAP_SERVER_UPPER_BOUND = 149,
17              CALL_SIM_LOWER_BOUND                    = 150,
18              DO_NOT_USE_THIS_VALUE_OR_ABOVE
19          }
20
21          INAP_Interface (    const AttachMode attachMode,
22                              const ServerID         procNumber );
23          INAP_Interface (    const AttachMode attachMode,
24                              const ServerID         lowerBound,
25                              const ServerID         upperBound );
26          virtual ~INAP_Interface();
27
28          int sendOp (    INAP_Operation *op, int microSeconds,
29                          ServerID serverID = INVALID_SERVER_ID );
30          INAP_Operation* getOp (int microSeconds );
31          bool isNearlyFull ( ServerID serverID = 0 );
32          bool isAlive ( const ServerID lowerBound,
33                         const ServerID upperbound = INVALID_SERVER_ID );
```

-continued

Class Definitions 6

| | |
|---|---|
| 34 | ServerID getMyServerID(); |
| 35 | |
| 36 | private: |
| 37 | |
| 38 |     CommsChannel* channel; |
| 39 |     ServerID myServerId; |
| 40 | } |

The INAP_Interface object channel is a common interface to the NIP common channels and application protocols. MyServerId identifies the message queue of the application program. The function sendOp( ) transmits an INAP Operation message to its destination. The getOp( ) function receives an INAP Operation message. The isNearlyFull( ) function determines if its upstream message queue is nearly full. The isAlive( ) function provides methods for checking if the remote application is up and running. The getMyServerID( ) function provides methods for retrieving myServerId.

in an INAP_InterfaceData object that is associated with an INAP_Operation object. The INAP_Operation object includes methods that allow a service application program or a TCAP server to obtain the type of the INAP operation represented by an INAP_Operation object and to get the contents of the INAP message represented by an INAP_Operation object. The INAP_Operation object further includes methods that allow a service application program or TCAP server to associate a specific INAP_Context object with the INAP_Operation object.

An INAP_Operation object has a reference to an INAP_InterfaceData instance. The INAP_InterfaceData object Class Definition 7

```
1    class CommsChannel
2    {
3        public:
4
5            CommsChannel();
6            virtual ~CommsChannel();
7
8            virtual int sendBuffer    (       const unsigned char serverId,
9                                      const  void*               bufPtr,
10                                     const  int                 bufSize,
11                                            int                 mseconds) = 0;
12           virtual int getBuffer(    void*  bufPtr,
13                                     int    bufSize,
14                                     int    msecond ) = 0;
15           virtual bool isNearlyFull ( const unsigned char serverId) = 0;
16           virtual bool isAlive (     const unsigned char lowerBound,
17                                      const unsigned char upperBound ) = 0;
18           virtual unsigned char getServerID() = 0;
19           virtual void rereadConfig() = 0;
20   }
```

In the CommsChannel object, the sendBuffer( ) function provides methods for sending a message to the message queue. The getBuffer( ) function provides methods for receiving a message from the message queue. The isNearlyFull( ) function checks if the outgoing message queue is nearly full. The isAlive( ) function provides methods for determining if any TCAP server is running. The getServerID( ) function retrieves the process server ID. The rereadConfig( ) function re-reads the configuration values from the config file.

An INAP_Context object is associated with each INAP_Operation object passed through the INAP interface from a TCAP server to a service application program or from a service application program to a TCAP server. The INAP_Context object and INAP operation object together abstract an INAP protocol message.

The INAP_Operation object is a base class object from which specific INAP operations are derived. There is a derived INAP_Operation object that represents each INAP operation. The INAP_Operation object includes only methods. The data corresponding to an INAP message is stored holds the data of an INAP message encapsulated by an INAP_Operation object. The access functions in the INAP Operation classes allow the service application program to retrieve or set the data in its INAP_InterfaceData instance. The disassociation of the data from an INAP_Operation object facilitates passing INAP_Operation objects between processes via InterProcess Communication Protocols. The INAP_InterfaceData class also maintains a static list of pointers to the used INAP_InterfaceData instances for memory reuse. After an INAP Operation message is sent to its destination, the pointer to the memory for its INAP_InterfaceData is added to the list for re-use. When an INAP Operation object is instantiated, the list of used memory addresses is checked first to determine if there is one available. When no used memory addresses are available according to the list, memory for the INAP_InterfaceData instance will only then be allocated. The INAP_InterfaceData objects may be reused by a service application program, allowing the service application program to avoid the overhead of allocating memory for each new INAP_Operation that it receives from the TCAP Server. An INAP_

InterfaceData object has an inap_ops object which holds the encapsulated INAP message. An INAP_InterfaceData object also has a Network_ContextID object, and a Service_ContextID object. The Network_ContextID object holds the address of the call context data in the TCAP Server. The Service_ContextID object holds the address of the call context data in the service application program. Passing only the addresses of call contexts eliminates the need for data to be passed between the TCAP Server and the service application program. The combined information of the reuse count and the TCAP Server process Id in the Network_ContextID object ascertains that the INAP Operation message received from the service application program belongs to the same dialogue stored in the call context by the TCAP Server. The INAP_Interface is an object that transmits messages between the TCAP Server and the service application program. A CommsChannel object encapsulates the InterProcess Communication Protocols. The CommsChannel is a virtual class and is inherited by classes of different protocols.

The INAP_Interface object represents the INAP interface used by TCAP servers and service application programs to pass INAP_Operation objects back and forth through the INAP interface. The INAP_Interface object essentially encapsulates the abstract communications interface of the present invention. The INAP_Interface objects contains a few simple methods. The method sendOp allows one process to send an INAP_Operation object to another. The method getOp allows a process to receive an INAP_Operation object that had been queued to a message queue associated with the process. There are, in addition, three methods that specify direct communications between a TCAP server and a service application program rather than communication between a service application program and an originating switch via a TCAP server. The method abortCallContext allows a TCAP server to notify a service application program that the dialogue between that service application program and an originating switch will be terminated by the TCAP server. Such termination may be undertaken by the TCAP server in response to a timeout arising from interruption of the physical links between the TCAP server and the originating switch. A service application program can indicate to the TCAP server that is ready to receive interface objects by calling the enableCallReceipt method, and can likewise indicate to the TCAP server that it is no longer available to receive interface objects by calling the method disableCallReceipts.

Simple inclusion of header files that specify the above discussed interface objects and the library routines that correspond to the methods provided by those objects allows a service application program to communicate with a TCAP server without the need for specialized communications software. The library routines of the INAP interface use the data included in the various interface objects to handle all INAP protocol details, including routing of INAP messages to appropriate targets and associating INAP messages to the context of a dialogue between an originating switch and a service application program.

Figure 5:
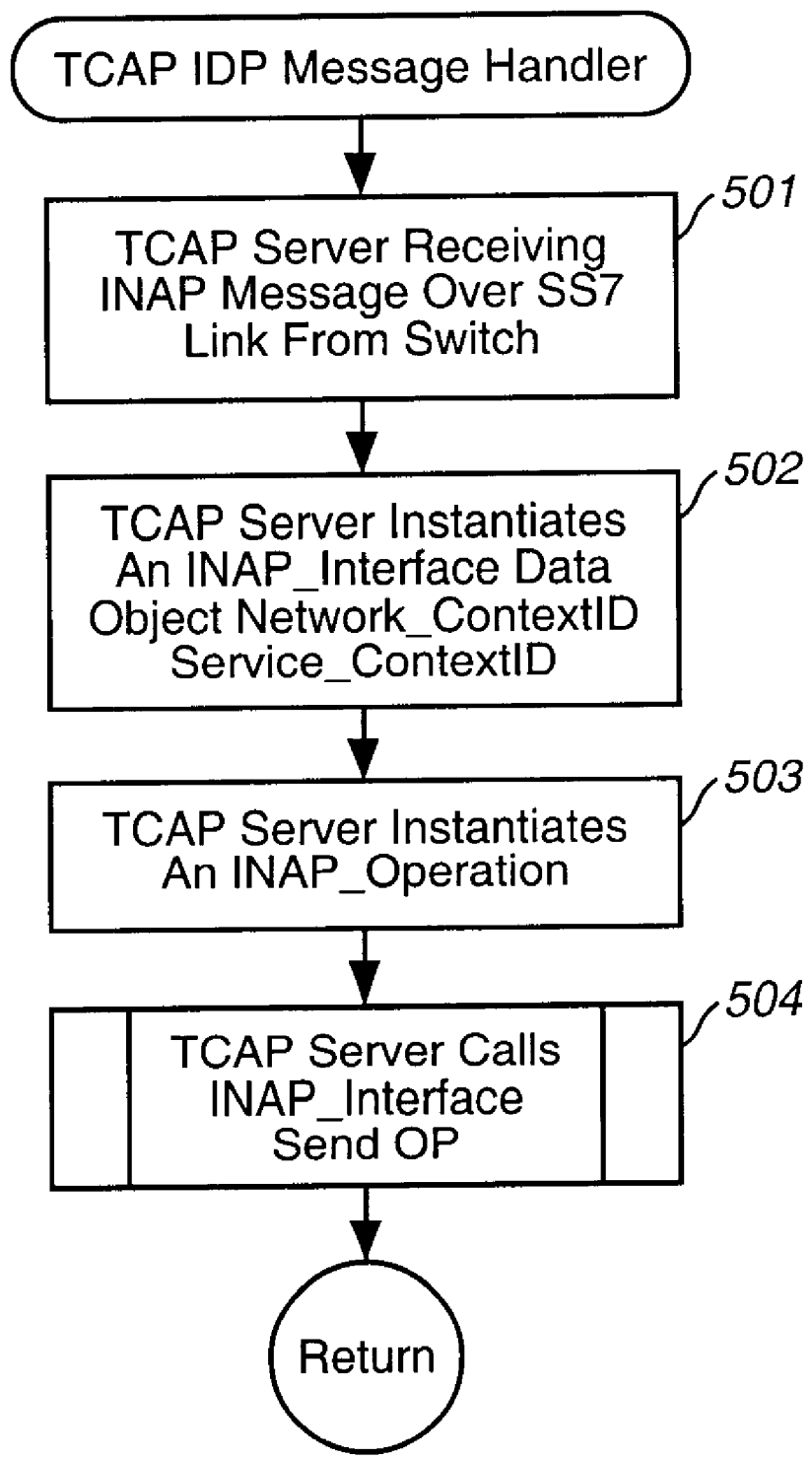
FIG. 5 displays a simple flow control diagram for the IDP message handling function of a TCAP server.

FIG. 5 displays a simple flow control diagram for the IDP message handling function of a TCAP server. In step 501, the TCAP server receives a TCAP protocol message from an originating switch and extracts the INAP message included within it. In step 502, the TCAP server instantiates an INAP_InterfaceData object. The INAP_InterfaceData object has an inap_ops object which holds the encapsulated INAP message. The INAP_InterfaceData object also has a Network_ContextID object and a Service_ContextID object that store the context information used to associate additional INAP messages to a dialogue between an originating switch and a service application program. In step 503, the TCAP server uses the INAP_InterfaceData object to instantiate an INAP_Operation object to encapsulate the received INAP Message. Finally, in step 504, the TCAP Server calls the INAP_Interface sendOp method to send the instantiated INAP_Operation object to the appropriate service application program. Each type of enhanced service request has an associated service application program.

The INAP_Interface routes a given INAP_Operation object to the appropriate service application program using the type of INAP operation represented by the INAP_Operation object. A single service application program handles each possible INAP operation. The INAP_Interface object maintains configuration information about the Inter-Process Communication facility that it uses, along with information contained in an INAP_Operation object, to determine to which message queue to direct a particular INAP_Operation object in response to an INAP_Interface sendOp method call.

Figure 6:
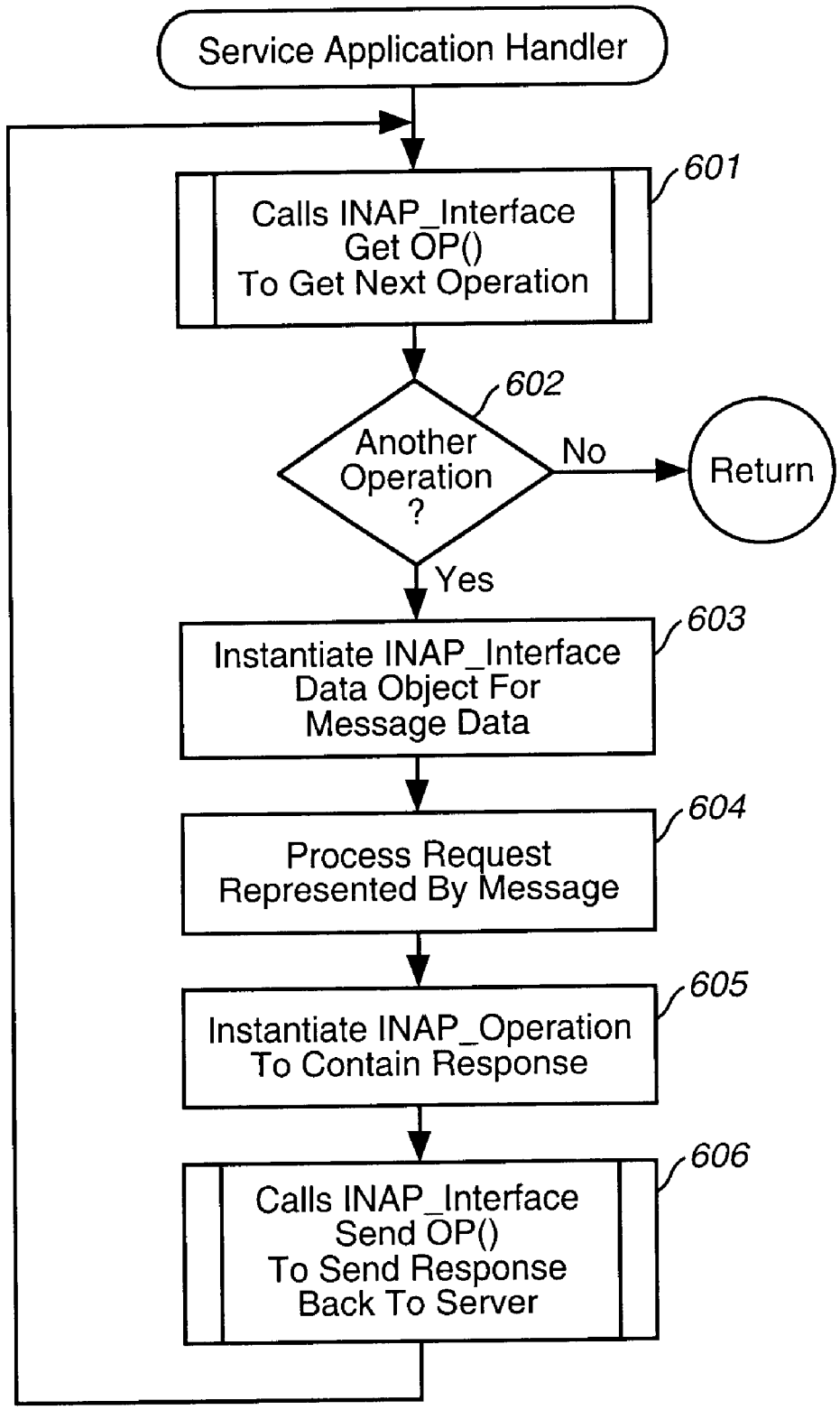
FIG. 6 displays a simple flow control diagram for a service application message handler.

FIG. 6 displays a simple flow control diagram for a service application message handler. This handler receives INAP_Operation objects from TCAP servers, executes the INAP operations request represented by those INAP_Operation objects, and returns INAP response messages through TCAP servers back to the appropriate originating switches. In step 601, the service application handler calls the INAP_Interface getOp method to retrieve the next INAP_Operation queued to the message queue associated with the service application program. The service application handler determines, in step 602, whether the INAP_Interface getOp method call has in fact returned a new INAP_Operation object. If so, control proceeds to step 603. Otherwise, the service application handler returns. The service application handler is called or awakened in response to the queuing of a new INAP_Operation object to the service application program's message queue by the INAP interface. The service application program may instead quiesce for a certain period of time and then again test for the receipt of INAP_Operation objects. When a new INAP_Operation object has been retrieved, the service application handler, in step 603, instantiates a INAP_InterfaceData object or reuses an existing INAP_InterfaceData object to include the data of the INAP message represented by the received INAP_Operation object. In step 604, the service application handler processes the request represented by the received INAP_Operation object. The service application handler calls INAP_Operation object methods to retrieve the type of the request and the contents of the request from the INAP_Operation object in order to process the request. Once the request is processed, the service application handler instantiates, in step 605, an INAP_Operation object to contain the response to the processed request. In step 606, the service application message handler calls the INAP_Interface sendOp method to send the instantiated INAP_Operation object back through the TCAP server to the originating switch.

Figure 7:
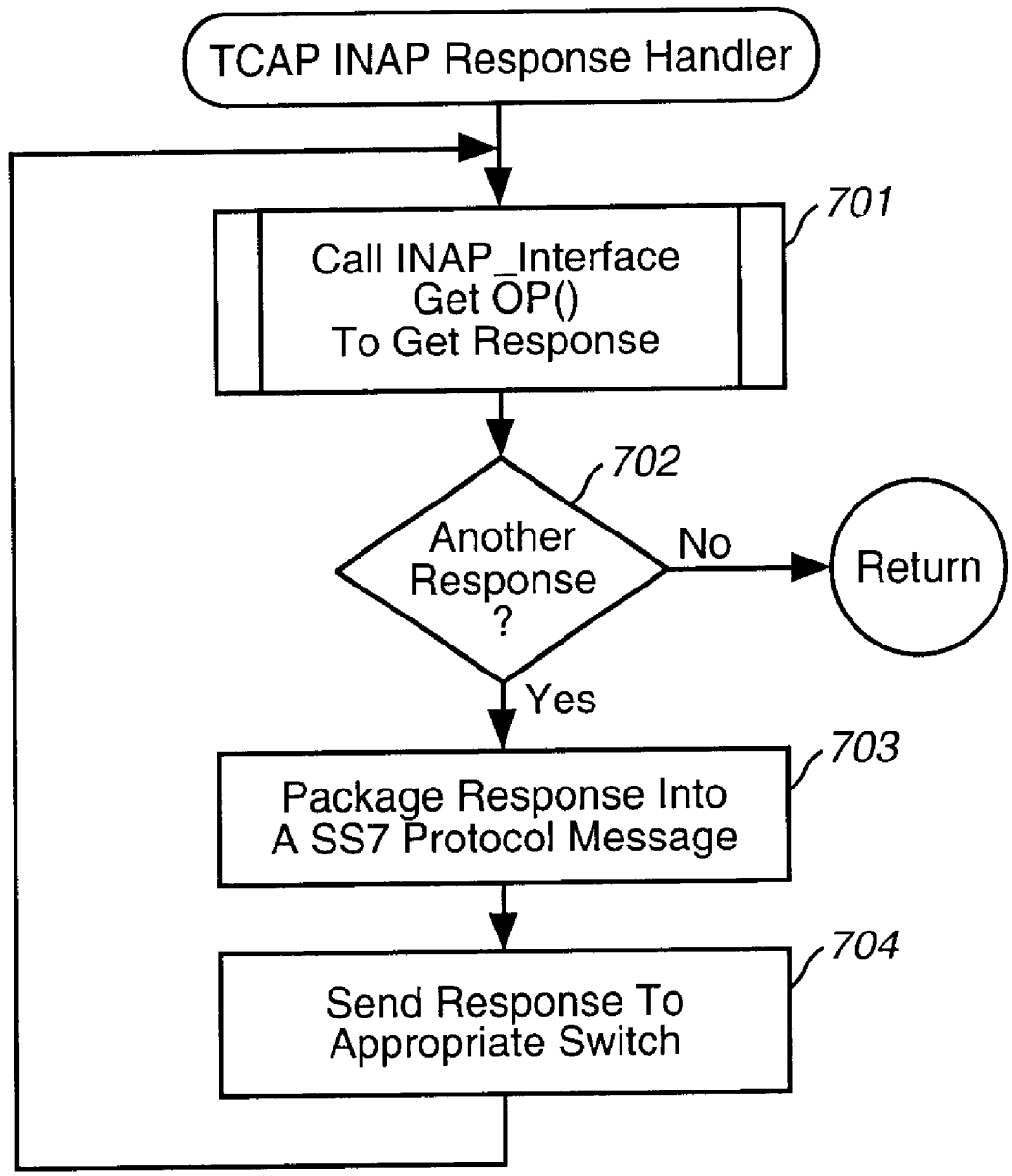
FIG. 7 displays a TCAP server response message handler.

FIG. 7 displays a TCAP server response message handler. This handler receives responses from service application programs and passes those responses back to originating switches. In step 701, the INAP response handler calls the INAP_Interface getOp method to retrieve the next response queued to the message queue associated with the TCAP server. If no response has been queued, as detected in step 702, the INAP response handler returns. Alternately, the INAP response handler could quiesce and then again test for any received response messages. In step 703, the INAP response handler packages a response INAP message included within a INAP_Operation object retrieved from the message queue associated with the TCAP server into a SS7 protocol message. In step 704, the INAP response handler sends the SS7 protocol message to the appropriate originating switch via a communications server running on the same NIP.

Figure 8:
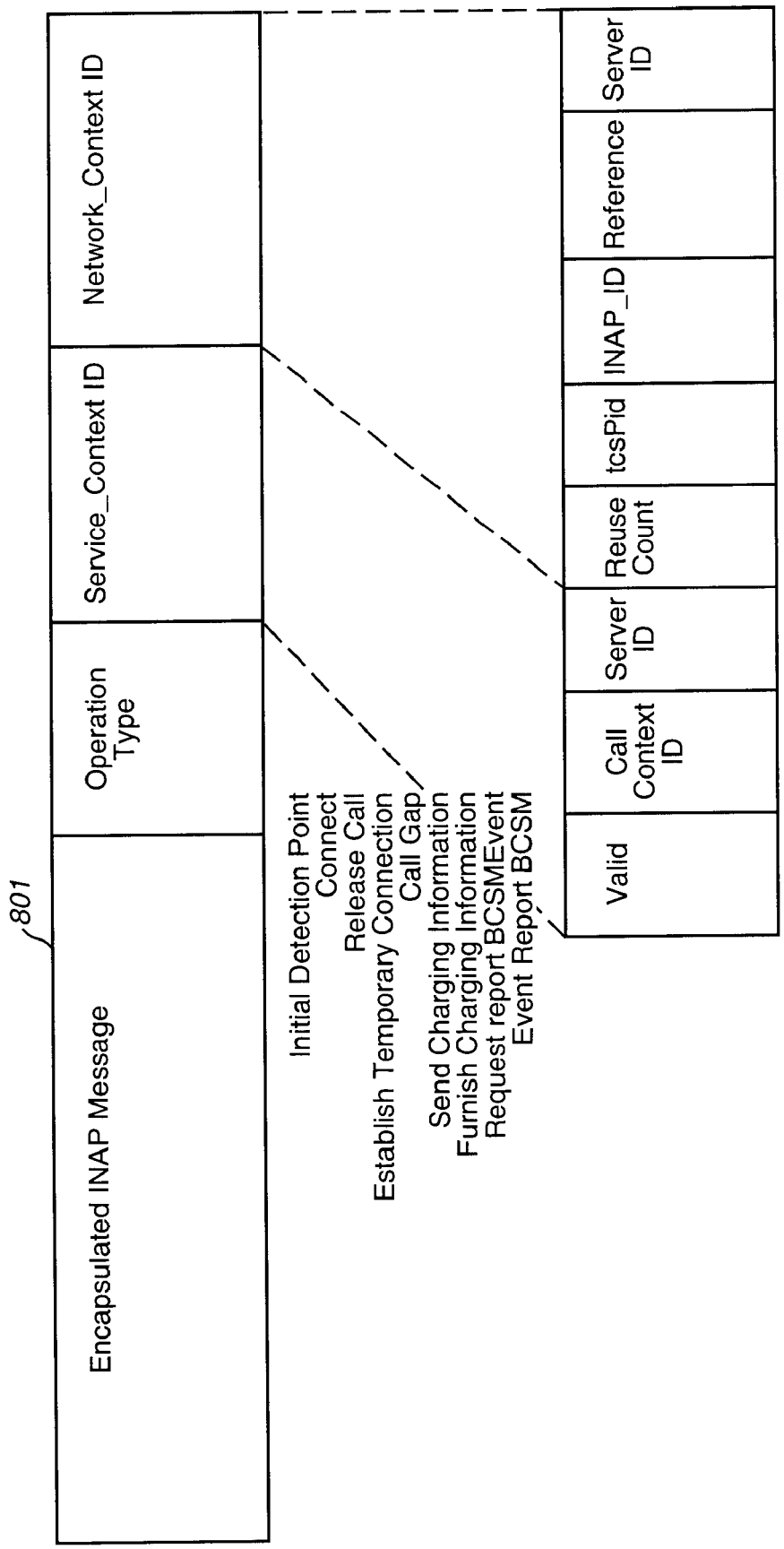
FIG. 8 illustrates an exemplary layout of an INAP message in the message buffer when an INAP_Operation object is sent between the TCAP server and the service application program through the INAP_Interface.
Figure 9:
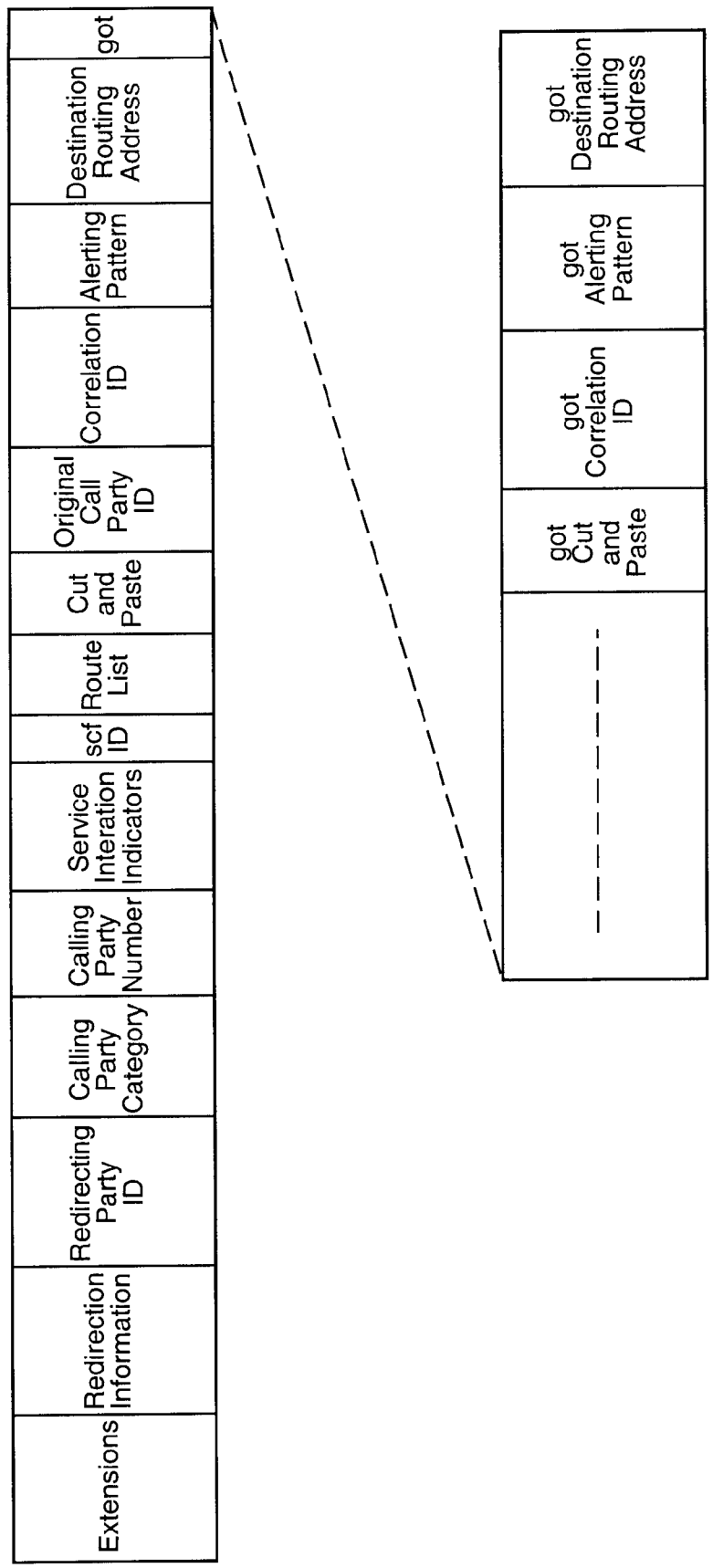
FIG. 9 illustrates an exemplary Connect Encapsulated INAP message.

FIG. 8 provides an exemplary layout for an INAP message in the message buffer when an INAP_Operation object is sent in between the TCAP Server and the service application program through the INAP_Interface. The actual INAP message is buried in part of Encapsulated INAP Message 801. An example of a type Connect Encapsulated INAP message is shown in FIG. 9. The data in the message buffer is actually the entire INAP_InterfaceData object. After using the INAP_Operation functions to construct an INAP_Operation object, the TCAP server uses the INAP_Interface::sendOp( ) function to send the INAP_InterfaceData object contained in the INAP_Operation object. On the other side, the service application program simply calls the INAP_Interface::getOp( ) function to receive the INAP Message, such as the Encapsulated INAP Message 801 shown in FIG. 8. The INAP Operation message type may be retrieved by one of the INAP_Operation access functions. With a known INAP Operation type, an INAP Operation is instantiated with the existing INAP_InterfaceData encapsulating the INAP message. All INAP Operation member attributes of a specific INAP Operation type can be retrieved and manipulated by using its access functions. Without the uses of INAP_Interface and INAP_Operation classes, the service application program will need to know every detail of the data structure and message layout of each INAP message type in order to retrieve or manipulate any field in the INAP message received from the message queue. The following example pseudocode illustrates a service application program's response to an Initial Detection Point INAP message with a Connect INAP message without the use of INAP_Interface and INAP_Operation classes. The service application program takes the Calling Party Number in the InitialDP and puts it in the Destination Routing Address in the responding Connect INAP message.

```
1    struct
2    {
3         Network_ContextID    networkID;
4         Service_ContextID    serviceID;
5         int                  operation Type;
6         union inap_ops       op;
7    } inBuf, outBuf;
8
9    //   Get an incoming INAP Message from the TCAP Server through a specific ipc
10   //   facility, e.g. UNIXQ
11   readFromUNIXQ (inQueueID, inBuf, sizeof (inBuf));
12
13   //   get the INAP Message type and cast the encapsulated INAP message to
14   //   its data structure
15   int operationType = inBuf.operationType;
16   CS1initialDP* idp = (CS1initialDP*)&(inBuf.op);
17
18   //   Check if we got the Calling Party Number in the InitialDP message
19   if (idp—>got.callingPartyNumber)
20   {
21        //   Initialize the out message buffer
22        memset (&outBuf, 0, sizeof (outBuf));
23
24        //   Set the out going INAP message type
25        outBuf.operationType = CS1CONNECT;
26
27        //   Cast the encapsulated INAP message to the output INAP message type
28        //   data structure
29        CS1connect* connect = (CS1connect*)&(outBuf.op);
30
31        //   Duplicate the networkID from the incoming message buffer to the
32        // outgoing message buffer
33        memcpy      (outBuf.networkID,
34                         inBuf.networkID,
35                         sizeof(outBuf.networkID));
36
37        //   use the call context in the networkID for the serviceID context
38        outBuf.serviceID.setCallContextIndex(inBuf.networkID—>getINAP_Id());
39        outBuf.serviceID.setValid(true);
40
41        //   Move the Calling Party Number from InitialDP INAP message to
42        //   the Destination Routing Address in the outgoing Connect message
43        connect—>CS1connect.got.destinationRoutingAddress = true;
44        memcpy      (connect—>CS1connect.destinationRoutingAddress,
45                         idp—>CS1initialDP.callingPartyNumber,
46                         sizeof(idp—>CS1initialDP.callingPartyNumber));
47
```

```
48      //  Send the Connect message back to the TCAP Server through UNIXQ
49      sendTO_UNIXQ (outQueueID, outBuf, messageSize);
50   }
```

This same program may be rewritten to use the INAP_Interface and INAP_Operation classes.

protocol interface. Different schemes might use a number of different base interface object types and different derivation

```
1    //   Instantiate an INAP_Interface object
2    INAP_Interface* interface = new INAP_Interface( INAP_Interface::SHARED,
3                                                    INAP_Interface::CALL_PROCESSING );
4    //   Get an incoming INAP message from the INAP_Interface
5    INAP_Operation* incoming = interface—>getOp();
6
7    //   Get the INAP message type and cast the whole message to its INAP
8    //   Operation class
9    int inapType = incoming—>getOperationType();
10   CS1_InitialDP* idp = ( CS1_InitialDP * ) incoming;
11
12   //   Retrieve the Calling Party Number from InitialDP INAP message
13   INAP_Number callingNumber;
14   if ( idp—>getCallingPartyNumber ( callingNumber ) )
15   {
16       //   use the call context in the networkID for the serviceID context
17       Service_ContextID serviceId;
18       serviceId.setCallContextIndex ( (long) networkId—>getINAP_Id() );
19       serviceId.setValid ( true );
20
21       //Construct the output INAP message
22       CS1_Connect connect (    callingNumber
23                                idp—>getNetwork_ContextID(),
24                                serviceId );
25
26       //   Send the Connect message out
27       interface—>sendOP ( ( INAP_Operation * )&connect );
28   }
```

The INAP_Interface class allows the service application program to send and receive INAP message objects to the TCAP Server without knowledge of the transmitting mechanism. By using the INAP_Operation class, the service application program does not need to know about the data structure or field names of any INAP message type to retrieve or manipulate data fields in an INAP message. The INAP_Interface object has a CommsChannel instance. The CommsChannel is a pure virtual class, which is a base class derived by all interprocess communication classes. This class holds no member attributes, all data needed for routing and configuration information are found only in its derived classes. When any function from the CommsChannel class is invoked, the polymorphic function from the transmitting type class is the one actually invoked. The service application program will be automatically configured to use the same interprocess communication protocol used by the TCAP server without knowledge about the protocol. When an INAP message is sent to the service application program, the TCAP server's server ID is contained in its Network-ContextID. In responding to the message, the service application program simply calls the sendOp( ) function, which routes the message back to the originating TCAP server according to the server ID.

Although the present invention has been described in terms of one embodiment, it is not intended that the invention be limited to this embodiment. Modifications within the spirit of the invention would be apparent to those skilled in the art. For example, many different encapsulation techniques could be devised in order to abstract the INAP hierarchies. Protocols other than the INAP protocol may be abstracted, and underlying lower-level protocols other than the SS7 protocol might be employed to transfer data between originating switches and NIPs. A different allotment of protocol handling tasks may be made to the various components of the NIP, including the intermediary, lover-level protocol handlers and the service providers. The scope of the present invention is defined by the claims that follow.

What is claimed is:

1. A method for sending a request intelligent network application protocol message from an originating switch in a telephone network to a service application program running on a transaction server computer using an object-oriented communications interface, the transaction server computer running a transactions capability applications part server, the request intelligent network application protocol message having a request type and including request data, the object-oriented communications interface having a number of interface objects, the method comprising:

constructing the request intelligent network application protocol message by the originating switch;

sending the request intelligent network application protocol message by the originating switch via a lower-level communications protocol interface to the transaction server computer;

receiving the request intelligent network application protocol message by the transactions capability applications part server running on the transaction server computer;

encapsulating by the transactions capability applications part server the request type and request data extracted from the request intelligent network application protocol message into a message encapsulation interface object;

passing the message encapsulation interface object by the transactions capability applications part server to the service application program by calling method of an object transfer interface object within the transactions capability applications part server;

receiving the message encapsulation interface object by calling a method of an object transfer interface object within the service application program; and calling methods of the received message encapsulation interface object by the service application program to obtain the request type and request data of the request intelligent network application protocol message.

2. The method of claim 1 wherein request message encapsulation further includes storing into the message encapsulation interface object an indication of the type of the request intelligent network application protocol message and a reference to a data encapsulation object that contains the request data of the request intelligent network application protocol message.

3. The method of claim 2 wherein request message encapsulation further includes storing into the message encapsulation interface object a reference to a context interface object that contains information about the originating switch that sent the request intelligent network application protocol message and the transactions capability applications part server that encapsulated the request intelligent network application protocol message into the message encapsulation interface object.

4. The method of claim 1 wherein a SS7 protocol interface is used for the lower-level communications protocol interface between the originating switch and the transaction server computer.

5. The method of claim 1 wherein the service application program sends a response intelligent network application protocol message back to the originating switch following receipt by the service application program of the message encapsulation interface object, the method further comprising:

constructing the response intelligent network application protocol message by the service application program by instantiating a second message encapsulation interface object to represent the response intelligent network application protocol message;

passing by the service application program the second message encapsulation interface object from the service application program to the transactions capability applications part server by calling the send method of the object transfer interface object within the service application program;

receiving the second message encapsulation interface object by the transactions capability applications part server by calling a get method of the object transfer interface object within the transactions capability applications part server;

calling methods of the received second message encapsulation interface object by the transactions capability applications part server to obtain the response intelligent network application protocol message encapsulated within the received second message encapsulation interface object; and sending the response intelligent network application protocol message by the transactions capability applications part server back to the originating switch via the lower-level communications protocol interface.

6. The method of claim 4 wherein instantiating the second message encapsulation interface object further includes storing into the second message encapsulation interface object a reference to a context interface object that contains information about the originating switch that sent the request intelligent network application protocol message and the transactions capability applications part server that encapsulated the request intelligent network application protocol message into the message encapsulation interface object, the information contained in the context interface object used by the send method of the object transfer interface object within the service application program to pass the second message encapsulation interface object back to the transactions capability applications part server that sent the encapsulated request intelligent network application protocol message to the service application program and further used by the transactions capability applications part server to send the response intelligent network application protocol message encapsulated within the received second message encapsulation interface object via the lower-level communications protocol interface back to the originating switch that sent the request intelligent network application protocol message to the transactions capability applications part server.

7. The method of claim 1 wherein a communications server computer receives the request intelligent network application protocol message sent by the originating switch via a lower-level communications protocol interface, extracts the request intelligent network application protocol message embedded within a transactions capability applications part message from the lower-level communications protocol interface, and sends the request intelligent network application protocol message embedded within the transactions capability applications part message to the transaction server computer via a local area network, and wherein the transactions capability applications part server running on the transaction server computer receives the transactions capability applications part message from the communications server computer and extracts from the transactions capability applications part message the request intelligent network application protocol message.

8. A computer system for executing a request for enhanced telecommunications services, the computer system comprising:

a memory for storing programs, including:

an intermediary protocol handling program that receives a request message from an originating switch in a telephone network according to an intelligent network application protocol (INAP), the request message being embedded within the transfer message, wherein the intermediary protocol handling program extracts the request message from the transfer message, a service provider program to which the intermediary protocol handling program passes the extracted request message and which executes the request for enhanced telecommunications services represented by the request message, and an object-oriented communications interface having a message encapsulation interface object that is used by the intermediary protocol handling program to encapsulate the extracted request message and used by the service provider program to extract the request type and request data from the encapsulated request message, the object-oriented communications interface additionally having an object transfer interface object that provides a transfer method for the intermediary protocol handling program to pass the message encapsulation interface object to the service provider program and provides a receive method for the service provider program to receive the message encapsulation interface object from the protocol handling program; and a processor for executing the programs stored in memory.

9. The system of claim 8 wherein the transactions capability applications part protocol within the SS7 protocol is used as the lower-level transfer protocol.

10. The system of claim 8 wherein the object-oriented communications interface further includes a context interface object that contains an indication of the identity of the service provider program and that is referenced by the message encapsulation interface object.

11. The system of claim 10 wherein the object-oriented communications interface further includes a data encapsulation interface object that contains the request data of the extracted request message and that is referenced by the message encapsulation interface object.

12. The system of claim 11 wherein the transfer method of the object transfer interface object called by the intermediary protocol handling program to pass the message encapsulation interface object to the service provider program passes sufficient information to the service provider program so that, when the service provider program calls the receive method of the object transfer interface object, the receive method is able to instantiate within the service provider program the message encapsulation interface object as well as the context interface object and the data encapsulation interface object referenced by the message encapsulation interface object.

13. The system of claim 10 wherein the service provider program, after executing the request for enhanced telecommunications services, encapsulates a response message into a second message encapsulation interface object that references the context interface object and calls the transfer method of the object transfer interface object to pass the second message encapsulation interface object back to the intermediary protocol handling program, the transfer method of the object transfer interface object using the context interface object referenced by the second message encapsulation interface object to determine how to pass the second message encapsulation interface object back to the intermediary protocol handling program.

14. The system of claim 8 wherein a connection is established between the originating switch and wherein the service provider program and the object transfer interface object has an additional method that is called by the intermediary protocol handling program to indicate to the service provider program that the connection between the originating switch and the service provider program will be terminated by the intermediary protocol handling program.

15. The system of claim 8 wherein the object transfer interface object has an additional method that is called by the service provider program to indicate to the intermediary protocol handling program that the service provider program is ready to receive message encapsulation interface objects from the intermediary protocol handling program.

16. The system of claim 15 wherein the object transfer interface object has an additional method that is called by the service provider program to indicate to the intermediary protocol handling program that the service provider program is no longer ready to receive message encapsulation interface objects from the intermediary protocol handling program.

17. A method for processing a request message for enhanced telecommunication services, the method comprising:

constructing a request message by an originating switch according to an intelligent network application protocol (INAP) for transmission to a service provider program running on a transaction server computer using an object-oriented communications interface, the transaction server computer running an intermediary protocol handling program, the request message having a request type and including request data, the object-oriented communications interface having a number of interface objects;

sending the request message by the originating switch via a lower-level communications protocol interface to the transaction server computer;

receiving the request message by the intermediary protocol handling program running on the transaction server computer;

encapsulating by the intermediary protocol handling program the request message into a message encapsulation interface object;

passing the message encapsulation interface object by the intermediary protocol handling program to the destination program by calling a method of an object transfer interface object within the intermediary protocol handling program;

receiving the message encapsulation interface object by the destination program by calling a method of an object transfer interface object within the destination program; and calling methods of the received message encapsulation interface object by the destination program to obtain the request type and request data of the request message.

18. The method of claim 17 wherein request message encapsulation further includes storing into the message encapsulation interface object an indication of the request type of the request message and a reference to a data encapsulation object that contains the request data of the request message.

19. The method of claim 18 wherein request message encapsulation further includes storing into the message encapsulation interface object a reference to a context interface object that contains information about the originating switch that sent the request message and the intermediary protocol handling program that encapsulated the request message into the message encapsulation interface object.

20. The method of claim 17 wherein a SS7 protocol interface is used for the lower-level communications protocol interface between the originating switch and the transaction server computer.

21. The method of claim 17 wherein the destination program sends a response message back to the originating switch following receipt by the destination program of the message encapsulation interface object, the method further comprising:

constructing the response message by the destination program by instantiating a second message encapsulation interface object to represent the response message;

passing the second message encapsulation interface object by the destination program to the intermediary protocol handling program by calling a method of the object transfer interface object within the destination program;

receiving the second message encapsulation interface object by the intermediary protocol handling program by calling a method of the object transfer interface object within the intermediary protocol handling program;

calling methods of the received second message encapsulation interface object by the intermediary protocol handling program to obtain the response message encapsulated within the received second message encapsulation interface object; and sending the response message by the intermediary protocol handling program back to the originating switch via the lower-level protocol communications interface.

22. The method of claim 21 wherein instantiating the second message encapsulation interface object further includes storing in the second message encapsulation object a reference to a context interface object that contains information about the originating switch that sent the request message and the intermediary protocol handling program that encapsulated the request message into the message encapsulation interface object, the information contained in the context interface object used by a method of the object transfer interface object within the destination program to pass the second message encapsulation interface object back to the intermediary protocol handling program that sent the encapsulated request message to the destination program and further used by the intermediary protocol handling program to send the response message encapsulated within the received second message encapsulation interface object via the lower-level protocol communications interface back to the originating switch that sent the request message to the intermediary protocol handling program.

23. A method for sending an intelligent network application protocol (INAP) request message from an originating switch in a telephone network to a destination program, the method comprising:

receiving the request message from a low-level communications protocol interface by an intermediate protocol handling program on a transaction server computer using an object-oriented communications interface according to a transactions capability application part protocol;

encapsulating by the intermediary protocol handling program the request message into a message encapsulation interface object; and passing the message encapsulation interface object to the destination program by calling a method of an object transfer interface object within the intermediary protocol handling program.

24. The method of claim 23, further comprising:

receiving the message encapsulation interface object by the destination program by calling a method of an object transfer interface object; and calling methods of the received message encapsulation interface object by the destination program to obtain a request type and request data of the request message.

25. The method of claim 23, further comprising:

constructing the request message by the originating switch; and sending the request message to the transaction server computer.

26. The method of claim 23 wherein the request message has a request type and contains request data.

27. The method of claim 23 wherein the destination program sends a response message back to the originating switch following receipt by the destination program of the message encapsulation interface object, the method further comprising:

constructing the response message by the destination program by instantiating a second message encapsulation interface object to represent the response message; and passing the second message encapsulation interface object by the destination program to the intermediary protocol handling program by calling a method of the object transfer interface object within the destination program.

28. The method of claim 27, further comprising:

receiving the second message encapsulation interface object by the intermediary protocol handling program by calling a method of the object transfer interface object within the intermediary protocol handling program; and calling methods of the received second message encapsulation interface object by the intermediary protocol handling program to obtain the response message encapsulated within the received second message encapsulation interface object.

29. The method of claim 28, further comprising sending the response message by the intermediary protocol handling program back to the originating switch via the lower-level protocol communications interface.

30. A method for processing an intelligent network application protocol (INAP) request message for enhanced telecommunication services, the method comprising:

sending the request message from an originating switch in a telephone network to a destination program running on a transaction server computer using an object-oriented communications interface according to a transaction capability application part protocol;

receiving a message encapsulation interface object by the destination program by calling a method of an object transfer interface object, wherein the message encapsulation interface object encapsulates the request message; and calling methods of the received message encapsulation interface object by the destination program to obtain a request type and request data of the request message.

31. The method of claim 30, further comprising:

receiving the request message from a low-level communications protocol interface by an intermediate protocol handling program on the transaction server computer;

encapsulating by the intermediary protocol handling program the request message into the message encapsulation interface object; and passing the message encapsulation interface object to the destination program by calling a method of an object transfer interface object within the intermediary protocol handling program.

32. The method of claim 30, further comprising:

constructing the request message by the originating switch.

33. The method of claim 30 wherein the destination program sends a response message back to the originating switch following receipt by the destination program of the message encapsulation interface object, the method further comprising:

constructing the response message by the destination program by instantiating a second message encapsulation interface object to represent the response message; and passing the second message encapsulation interface object by the destination program to the intermediary protocol handling program by calling a method of the object transfer interface object within the destination program.

34. The method of claim 33, further comprising:

receiving the second message encapsulation interface object by an intermediate protocol handling program on the transaction server computer that calls a method of the object transfer interface object; and calling methods of the received second message encapsulation interface object by the intermediary protocol handling program to obtain the response message encapsulated within the received second message encapsulation interface object.

35. The method of claim 34, further comprising sending the response message by the intermediary protocol handling program back to the originating switch via the lower-level protocol communications interface.

* * * * *